United States Patent
Pepitone

(10) Patent No.: US 7,630,829 B2
(45) Date of Patent: Dec. 8, 2009

(54) GROUND INCURSION AVOIDANCE SYSTEM AND DISPLAY

(75) Inventor: David Pepitone, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 829 days.

(21) Appl. No.: 11/231,216

(22) Filed: Sep. 19, 2005

(65) Prior Publication Data

US 2007/0067093 A1 Mar. 22, 2007

(51) Int. Cl.
*G06F 19/00* (2006.01)

(52) U.S. Cl. .............................. 701/120; 701/9; 701/13; 701/14; 340/945; 340/947; 244/75.1

(58) Field of Classification Search ............... 701/3, 701/4, 7, 9, 13–14, 24, 120; 340/945, 947–948, 340/969, 967; 244/75.1, 183
See application file for complete search history.

(56) References Cited

U.S. PATENT DOCUMENTS

| | | | |
|---|---|---|---|
| 6,119,985 A * | 9/2000 | Clapp et al. .............. | 244/171.4 |
| 2002/0089432 A1* | 7/2002 | Staggs et al. ................ | 340/945 |

| | | | |
|---|---|---|---|
| 2007/0018887 A1 | 1/2007 | Feyereisen et al. | |
| 2007/0078591 A1 | 4/2007 | Meunier et al. | |

FOREIGN PATENT DOCUMENTS

WO 03107299 A2 12/2003

OTHER PUBLICATIONS

European Search Report for Application No. 06120867, mailed on Jan. 27, 2009.

* cited by examiner

*Primary Examiner*—Gertrude Arthur Jeanglaud
(74) *Attorney, Agent, or Firm*—Ingrassia Fisher & Lorenz, P.C.

(57) ABSTRACT

An airborne processor is linked to a ground-based, vehicle based, or satellite-based supplier of approaching aircraft data and/or terrain data, including airfield structures. The processor also has access to the aircraft's state, e.g. position, speed, intended route, aircraft dimensional data, or the like. Algorithms within the processor calculate a zone of protection about the aircraft in light of aircraft type, turning radius, and other identifying data. The processor combines the present and estimated future positions of the aircraft with the approaching aircraft and/or airfield structure data, and creates an alert to the crew if a threat of a ground incursion is detected. The display provides a visual of the zone of protection about the aircraft, and approaching aircraft and/or airfield structure to draw the attention of the crew to the threat.

19 Claims, 7 Drawing Sheets

GROUND INCURSION AVOIDANCE SYSTEM AND DISPLAY

TECHNICAL FIELD

The present invention relates to a display for a vehicle, and more particularly to a system and method for displaying a zone of protection associated with an aircraft while maneuvering on ground.

BACKGROUND OF THE INVENTION

Situational awareness is of utmost importance when operating a vehicle, such as an aircraft. Aircraft crew typically have a very limited awareness of their aircraft's dimensions and virtually no awareness of the proximity of the aircraft's wingtips and tail in relationship to other aircraft and airfield structures during ground maneuvers, such as in holding areas, near gate ramps, and near airport buildings. This compromise in situational awareness during ground maneuvers can increase the likelihood of ground incursions. Ground incursions between aircraft and airfield structures, or other aircraft, can be relatively expensive and potentially hazardous for the aircraft owners, operators and airport authorities. For example, aircraft are currently able to broadcast their position, altitude, and other related information through ADS-B. This information can be received by other aircraft within a 100 NM (nautical mile) radius, including aircraft performing ground maneuvers. Aircraft within that vicinity can pick up the information and can then display it on their cockpit displays. While this type of information is useful for preventing some aircraft incursions during runway ground maneuvers, interpreting the information received from such broadcast while maneuvering the aircraft in very tight, congested areas, such as holding areas and gate ramps, is more difficult.

Modern aircraft displays can provide a visual presentation of information in both a graphical display and a textual display. Displays used in aircraft, and particularly those used in aircraft for flight planning and monitoring, are capable of displaying a considerable amount of information such as flight plan information, terrain information, airborne weather data ADS-B data, obstacle data, traffic sensor data or Traffic alert and Collision Avoidance System (TCAS) data, relative terrain data and Enhanced Ground Proximity Warning System (EGPWS) data. The displayed information is crucial to aircraft operation, and can provide situational awareness to the pilot when the aircraft is in the air, or on the ground.

The display of aircraft information to curtail incursions between two or more aircraft or between an aircraft and an airport structure is of great importance. Hence, there is a need for a display system and method that displays, in real-time, a zone of protection associated with aircraft during ground maneuvers. The display of this type of information would reduce the workload on the flight crew during taxi, and maneuver about gate ramps, in holding areas and near airfield structures, and/or reduce the probability of an aircraft incursion occurring during these ground maneuvers. The present invention addresses one or more of these needs.

BRIEF SUMMARY OF THE INVENTION

The present invention provides a display system and method that displays, in real-time, a zone of protection associated with an aircraft during ground maneuver.

In one embodiment, and by way of example only, a flight deck display system includes a processor and a display device. The processor is adapted to receive data representative of an aircraft during a ground maneuver, and operable in response thereto to determine a zone of protection associated with an aircraft and supply one or more image rendering display commands. The display device is coupled to receive the image rendering display commands and is operable, in response thereto, to render an image representative of the zone of protection.

In another exemplary embodiment, a method of displaying a zone of protection during a ground maneuver on an aircraft flight deck display system includes the steps of obtaining real-time vehicle ownship data and at least one of real-time additional vehicle data and airfield structure data. The method further includes determining a zone of protection associated with the vehicle ownship, and a zone of protection associated with at least one of the additional vehicle and the airfield structure, and displaying an image representative of the determined zones of protection on the aircraft flight deck display system. Algorithms within the computer combine the data representative of the present and estimated future positions of the aircraft with the approaching aircraft and/or airfield structure data, and create an alert to the crew if a threat is detected.

BRIEF DESCRIPTION OF THE DRAWINGS

The present invention will hereinafter be described in conjunction with the appended drawing figures, wherein like numerals denote like elements, and.

DETAILED DESCRIPTION

Figure 1:
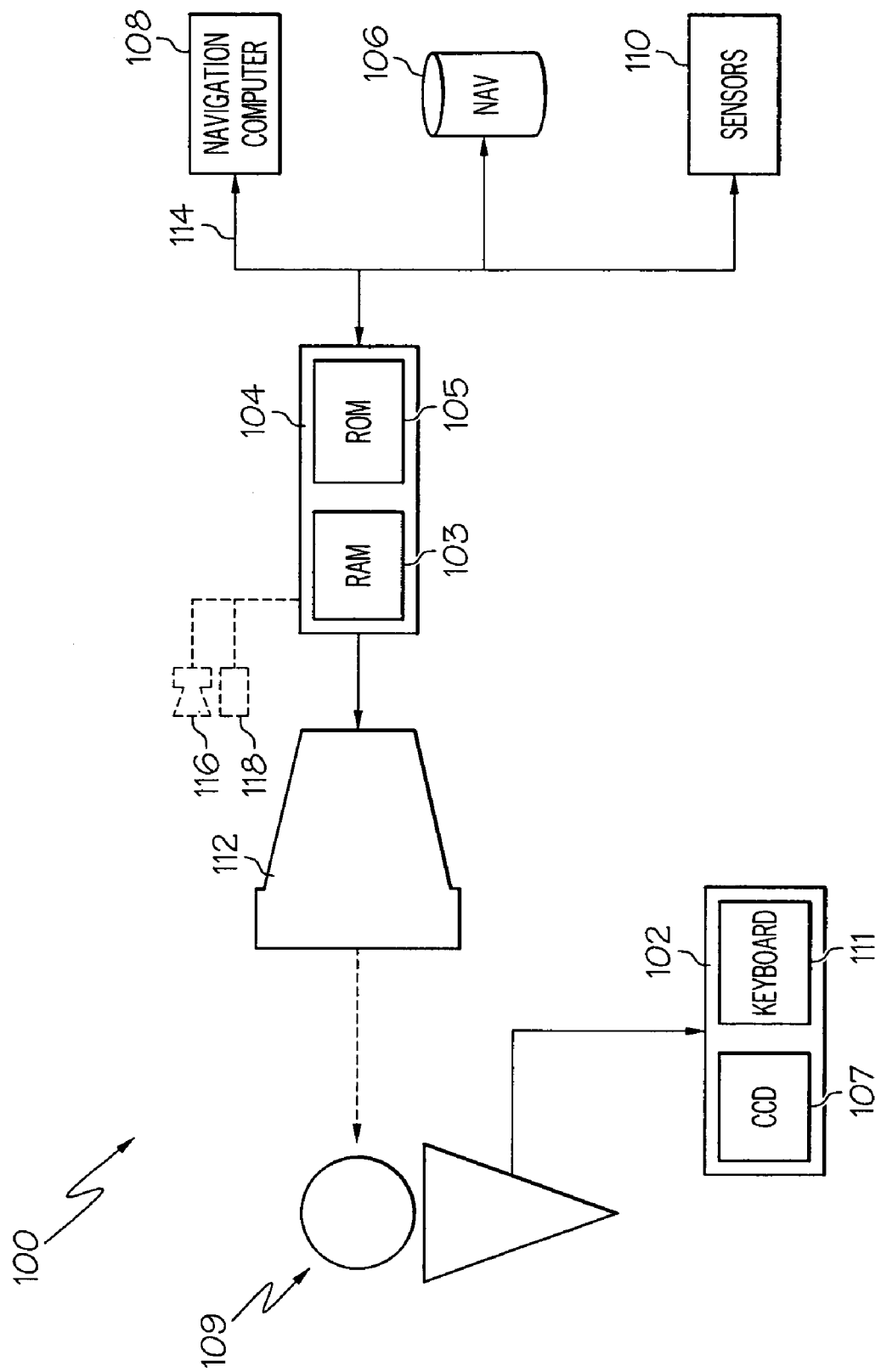
FIG. 1. is a functional block diagram of an integrated flight display system usable with the instant invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing element, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to the description, and with reference to FIG. 1, an exemplary flight deck display system will be described. The system 100 includes at least a user interface 102, a processor 104, an aircraft identification database 101, one or more navigation databases 106, a navigation computer 108, a plurality of sensors 110, and a display device 112. The plurality of sensors 110 may include inertial sensors or a GPS (Global Positioning System) that is capable of providing several of the described inputs, such as aircraft speed, position, and altitude. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen, and may use the keyboard 111 to, among other things, input various data.

The processor 104 is in operable communication with the navigation computer 108, the aircraft identification database 107, the sensors 110, and the display device 112 via, for example, a communication bus 114. The processor 104 is coupled to receive various types of data from the navigation computer 108, aircraft identification database 107, and the sensors 110 and may additionally receive navigation data from one or more of the navigation databases 106, and is operable to supply appropriate display commands to the display device 112 that cause the display device 112 to render various images. Though not shown in FIG. 1, it will be appreciated that the processor 104 may additionally be coupled to receive various data from one or more other external systems. For example, the processor 104 may also be in operable communication with a source of weather data, a terrain avoidance and warning system (TAWS), an ADS-B system, a traffic and collision avoidance system (TCAS), an instrument landing system (ILS), and a runway awareness and advisory system (RAAS), just to name a few. If the processor 104 is in operable communication with one or more of these external systems, it will be appreciated that the processor 104 is additionally configured to supply appropriate display commands to the display device 112 so that the data supplied from these external systems may also be selectively displayed on the display device 112.

A number of aspects of display element 112 (which are controlled by processor 104 in a practical embodiment) may contribute to the improved contents and appearance of the display, thus increasing the situational and terrain awareness of the pilot and/or flight crew. The image generation and display aspects may leverage known techniques such that existing display systems can be modified in a straightforward manner to support the different features described herein. In a practical implementation, the concepts described herein may be realized in the form of revised display generation software or processing resident at processor 104.

Processor 104 typically encompasses one or more functional blocks used to provide flight management, navigational, weather, terrain, and positional interface with the pilot, and input to display element 112. Processor 104 may include or cooperate with a mode, position and/or detection element that is capable of determining the mode or position of the vehicle relative to one or more reference locations, points, planes, or navigation aids. In addition, processor 104 may be configured to receive, analyze, condition, and process navigation and positional information, including flight path information as well as ground positional information associated with the vehicle. In this regard, processor 104 may include any number of individual microprocessors, flight computers, navigation equipment, memories, storage devices, interface cards, and other standard components known in the art. Moreover, processor 104 may include any number of microprocessor elements, memory elements, power supplies, and other functional components as necessary to support the operation of the display system 100. In this respect, processor 104 may include or cooperate with any number of software programs or instructions designed to carry out various methods, process tasks, calculations, control functions, and the generation of display signals and other data used by display element or monitor 112. For example, processor 104 may be configured to generate an annunciator associated with the position of the aircraft relative to at least one reference location or surrounding aircraft, to generate windows corresponding to user inputs, to combine inputs from the sensors 110 to create a data stream for presentation to the display element 112, and the like.

In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters maybe stored in the RAM 103. It will be appreciated that this is merely exemplary of one scheme for storing operating system software and software routines, and that various other storage schemes may be implemented. It will also be appreciated that the processor 104 may be implemented using various other circuits, not just one or more programmable processors. For example, digital logic circuits and analog signal processing circuits could also be used.

The navigation databases 106 include various types of navigation-related data. These navigation-related data include various flight plan related data such as, for example, waypoints, distances between waypoints, headings between waypoints, navigational aids, obstructions, special use airspace, political boundaries, communication frequencies, aircraft departure and approach information, protected airspace data, and data related to different airports including, for example, runway-related data. It will be appreciated that, although the navigation databases 106 are, for clarity and convenience, shown as being stored separate from the processor 104, all or portions of these databases 106 could be loaded into the on-board RAM 103, or integrally formed as part of the processor 104, and/or RAM 103, and/or ROM 105. The navigation databases 106, or data forming portions thereof, could also be part of one or more devices or systems that are physically separate from the display system 100.

The aircraft identification database 101 includes various types of identification-related data. These aircraft identification-related data include aircraft structural dimensions for ownship and other aircraft. These dimensions are public data available from the FAA type certification office. The dimensional data allows the display system 100 to scale the size of the aircraft and to generate the zone of protection having appropriately sized dimensions. It will be appreciated that, although the aircraft identification database 105 is, for clarity and convenience, shown as being stored separate from the processor 104, all or portions of these database 101 could be loaded into the on-board RAM 103, or integrally formed as part of the processor 104, and/or RAM 103, and/or ROM 105. The aircraft identification database 101 could also be part of one or more devices or systems that are physically separate from the display system 100.

The navigation computer 108 is in operable communication, via the communication bus 114, with various data sources including, for example, the navigation databases 106. The navigation computer 108 is used, among other things, to allow the pilot 109 to program a flight plan from one destination to another, and to input various other types of flight-related data. The flight plan data may then be supplied, via the communication bus 114, to the processor 104 and, in some embodiments, to a non-illustrated flight director. In the depicted embodiment, the navigation computer 108 is additionally configured to supply, via the communication bus 114, data representative of the current flight path and the aircraft category to the processor 104. In this regard, the navigation computer 108 receives various types of data representative of the current aircraft state such as, for example, aircraft speed, altitude, and heading. The navigation computer 108 supplies the programmed flight plan data, the current flight path data, and, when appropriate, the aircraft category to the processor 104, via the communication bus 114. The processor 104 in turn supplies appropriate display commands to the display device 112 so that the programmed flight plan, or at least portions thereof, and the current flight path may be displayed, either alone or in combination, on the display device 112. The processor 104 also receives data from the navigation databases 106, either directly or indirectly, and in turn supplies appropriate display commands to the display device so that at least a portion of the retrieved data are displayed on the display device 112 along with the flight plan and/or current flight path. In addition, the processor 104 receives data from the sensors 110, including a GPS system, either directly or indirectly, and in turn supplies appropriate display commands to the display device so that at least a portion of the retrieved data including a zone of protection about an aircraft on the ground is displayed on display device 112. It will additionally be appreciated that all or portions of the data mentioned herein may be entered manually by a user, such as the pilot 109.

The display device 112 is used to display various images and data, in both a graphical and a textual format, and to supply visual feedback to the user 109 in response to the user input commands supplied by the user 109 to the user interface 102. It will be appreciated that the display device 112 may be any one of numerous known displays suitable for rendering image and/or text data in a format viewable by the user 109. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, display device 112 includes a panel display. To provide a more complete description of the method that is implemented by the display system 100, a general description of the display device 112 and its layout will now be provided.

Figure 2:
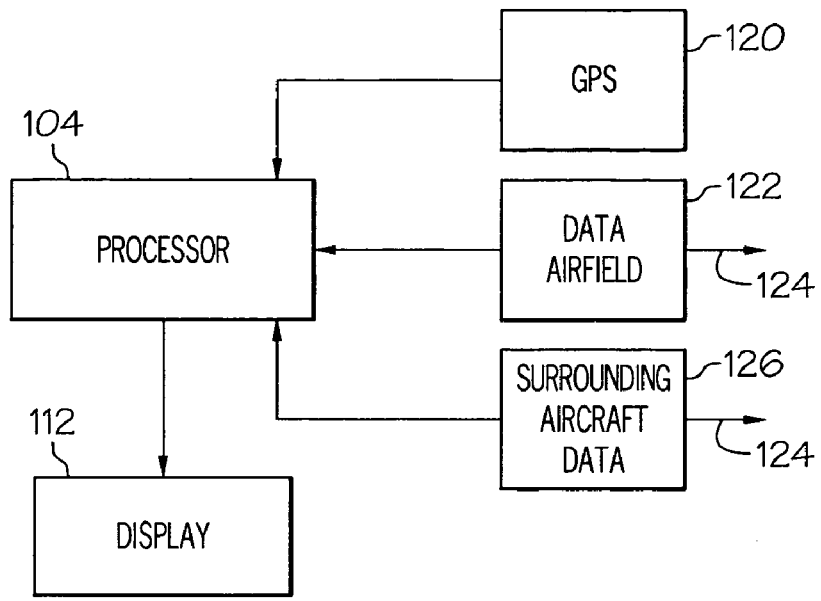
FIG. 2. is a functional block diagram of a stand-alone computer display system usable with the instant invention.

Returning now to the description, as was previously noted the integrated flight display system of FIG. 1 is shown as a preferred embodiment, since many aircraft of the business or airline categories have such integrated flight display system on board. It is possible, however to provide a simplified ground incursion avoidance system and display performing as a separate cockpit processor. Such a system is shown in FIG. 2 and comprises a computer or processor 104 (similar components in FIG. 2 are given the same numbers as their counterpart components of FIG. 1, although it is understood that the system of FIG. 1 incorporates many more function than that of FIG. 2). Processor 104 of FIG. 2 may simply comprise a typical laptop computer that could be carried by a crewmember from aircraft to aircraft, or it could be a stand-alone computer on an aircraft with an integrated display system and dedicated to this one task or several other tasks.

Interfaced to the processor 104 is a GPS 120 or other device capable of relating the groundspeed, altitude, and position of the aircraft. This component is similar to the sensors 110 of FIG. 1 and, as previously described, one of the sensors 110 of FIG. 1 may well be a GPS receiver. Other inputs to the processor 104 of FIG. 2 may include a source of airfield information 122 which may be obtained, for example, through a telecommunications link 124 to a ground station or satellite and surrounding aircraft information 126 which may also be obtained through the telecommunications link 124 to a ground station or satellite or through an ADS-B system. The display 112 of FIG. 2 may be the processor's display itself (as in the case of a laptop computer) or a separate display in the event the processor 104 has no integral display.

Figure 3:
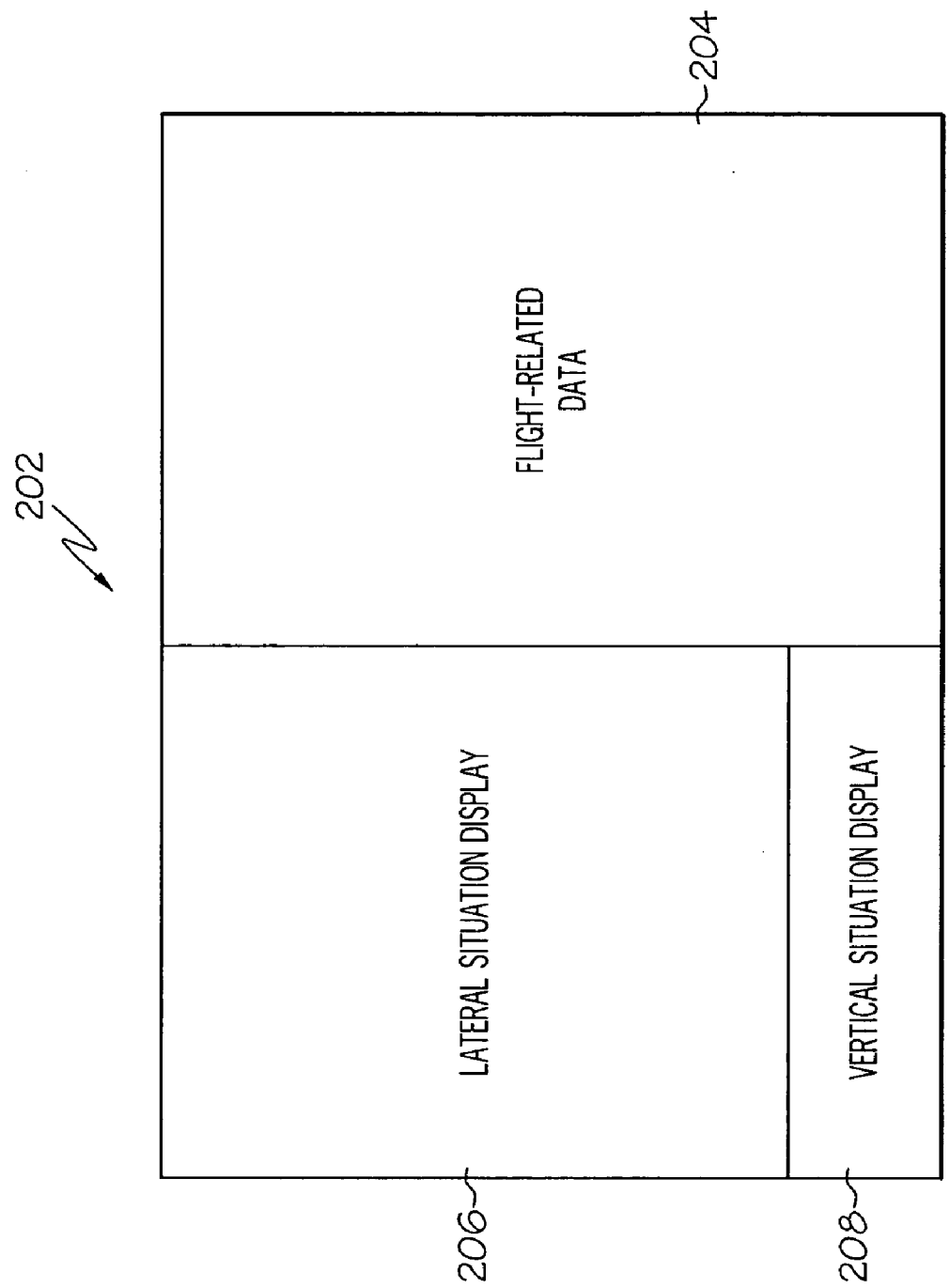
FIG. 3 is a simplified representation of an exemplary display screen that may be used in the system of FIG. 1, which shows the overall layout of the display screen, and on which various images may be simultaneously displayed.

With reference to FIG. 3, it seen that the display device 112 includes a display area 202 in which multiple graphical and textual images may be simultaneously displayed, preferably in different sections of the display area 202. For example, general flight-related data 204, a lateral situation display 206, and a vertical situation display 208 may be displayed simultaneously, alone, or in various combinations, in various sections of the display area 202. The general flight-related data 204 that is displayed may include various types of data related to the flight plan of the aircraft. Such data includes, but is not limited to, the flight identifier, route iteration number, a way-point list and associated information, such as bearing and time to arrive, just to name a few. It will be appreciated that the general flight-related data 204 may additionally include various types of data associated with various types of flight hazards. Examples of these, and other types of data that may be displayed, are disclosed in U.S. Pat. No. 6,289,277, entitled "Interfaces for Planning Vehicle Routes," which is assigned to the assignee of the present application, and the entirety of which is hereby incorporated by reference.

The lateral situation display 206 provides a two-dimensional lateral situation view of the aircraft along the current flight path, and the vertical situation display 208 provides either a two-dimensional profile vertical situation view or a perspective vertical situation view of the aircraft along the current flight path and/or ahead of the aircraft. While not depicted in FIG. 2, the lateral situation display 206 and the vertical situation display 208 may each selectively display various features including, for example, a top-view symbol and a side-view aircraft symbol, respectively, in addition to the displayed current flight plan, various navigation aids, and various map features below and/or ahead of the current flight path such as, for example, terrain, runways, and political boundaries. Additionally, the lateral situation display 206, and in some instances the vertical situation display 208, may each selectively display indicia representative of a zone of protection associated with the incursion avoidance system of the present invention. It will be appreciated that the lateral situation display 206 and the vertical situation display 208 preferably use the same scale so that the pilot can easily orient the present aircraft position to either section of the display area 202. It will additionally be appreciated that the processor 104 may implement any one of numerous types of image rendering methods to process the data it receives from the navigation databases 106, the navigation computer 108, and or sensors 110 and render the views displayed therein.

It was noted above that the flight-related data 204, the lateral situation display 206, and the vertical situation display 208 may be displayed either alone or in various combinations. Hence, before proceeding further with the description, it should be appreciated that, for clarity and ease of explanation and depiction, in each of the figures referenced below only the lateral situation display 206 is shown being displayed in the display area 202 of the display device 112.

Returning now to the description, as was previously noted, during ground maneuver the pilot 109 is responsible for keeping the aircraft safe from incursion with other surrounding aircraft and/or airfield structures (e.g. gate ramps, airport buildings, or the like). Thus, the processor 104 receives data, including data representative of aircraft ownship, surrounding aircraft, and/or airfield structures, determines a zone of protection associated with each, and supplies display commands that cause the lateral situation display 206, in addition to or instead of one or more of the features mentioned above, to render a two-dimensional lateral situation view of a zone of protection, or envelope, associated with each of the aircraft ownship, surrounding aircraft, and/or airfield structures. The zone of protection may be color coded depending upon the level of excursion of the aircraft into another aircraft's zone of protection, or near an airfield structure.

Figure 4:
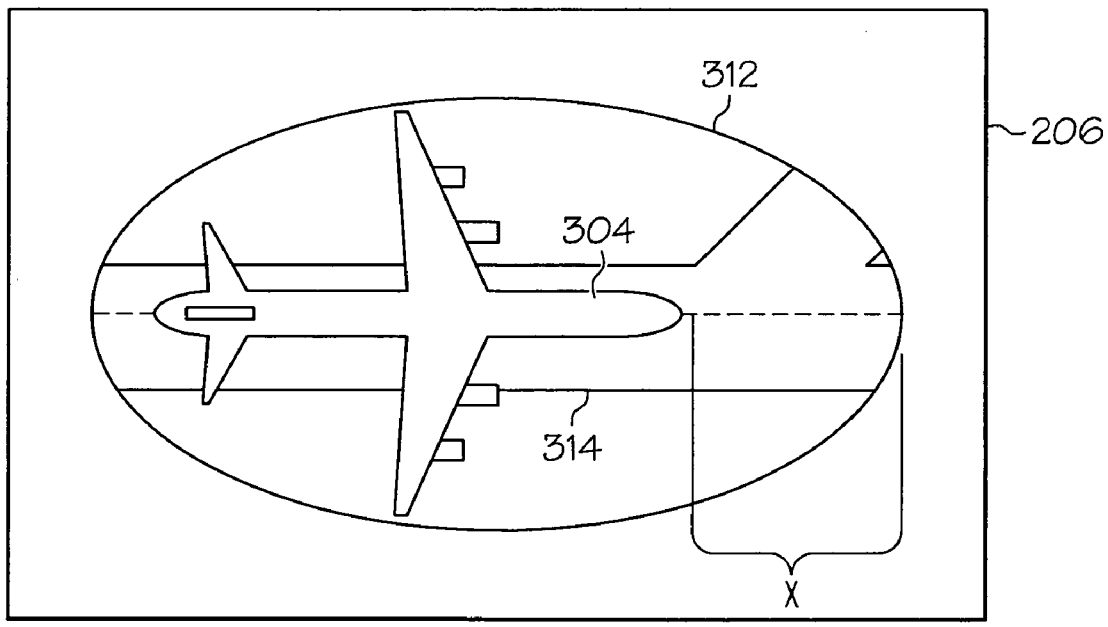
FIG. 4 is an exemplary display screen that depicts a lateral situation view of an aircraft's zone of protection in accordance with the instant invention.

Referring now to FIG. 4, the processor 104 is adapted to receive data representative of an aircraft during ground maneuvers and operable, in response thereto, to supply one or more image rendering display commands. The processor supplies display commands that cause the lateral situation display 206 to render a two-dimensional lateral situation view of a zone of protection associated with the aircraft. The lateral situation display 206 includes a top-view aircraft symbol 304 and an indicator of the zone of protection 312 associated with aircraft ownship. The lateral situation display 206 also preferably includes various map features including, but not limited to, a lateral two-dimensional view of airfield terrain 314 (e.g. runway, navigational aids, or the like) about which the aircraft 304 is maneuvering. It will be appreciated that for clarity only the terrain 314 map feature is shown in FIG. 3.

In displaying the lateral situation view 206 of the zone of protection 312, the overall shape of the zone of protection 312 will elongate to provide early warning in a specific direction of aircraft ground travel and provide early warning of an impending incursion into another aircraft's zone of protection or an airfield structure. The shape of zone of protection 312 is determined by various factors, including but not limited to, the turn radius of the wings, nose and tail of the aircraft, the forward and backward groundspeed (e.g. pushback, taxi, of the like), the turn direction of the aircraft, and an early warning distance, noted as "x" in FIG. 3. The early warning distance "x" is a distance dependent upon the time and distance according to received aircraft data that would provide sufficient time and distance for the crew to react to an impending incursion. The zone of protection 312 will change as early warning distance "x" changes in response to received aircraft data.

Figure 5:
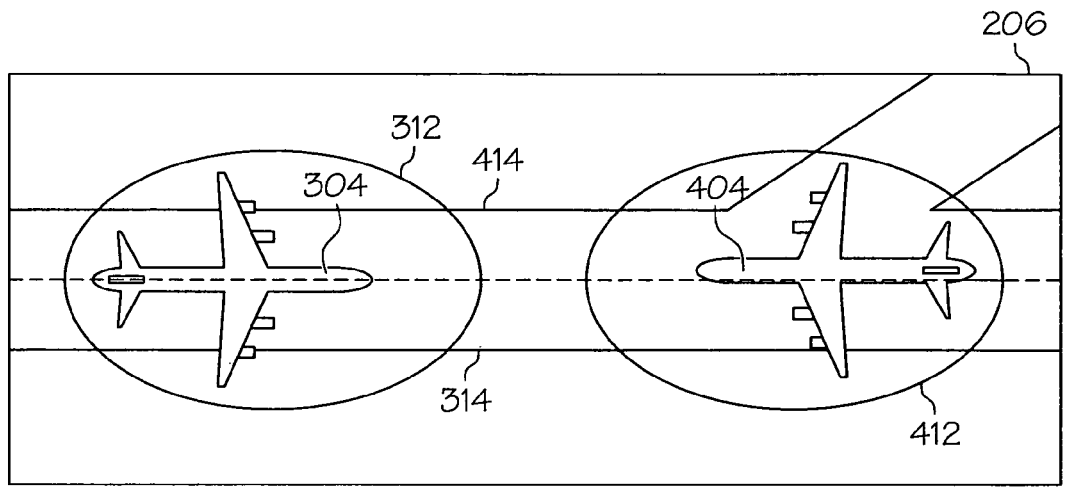
FIGS. 5-7 are exemplary display screens that depict lateral situation views of an aircraft's zone of protection relative to the zone of protection of an approaching aircraft in accordance with the instant invention.
Figure 6:
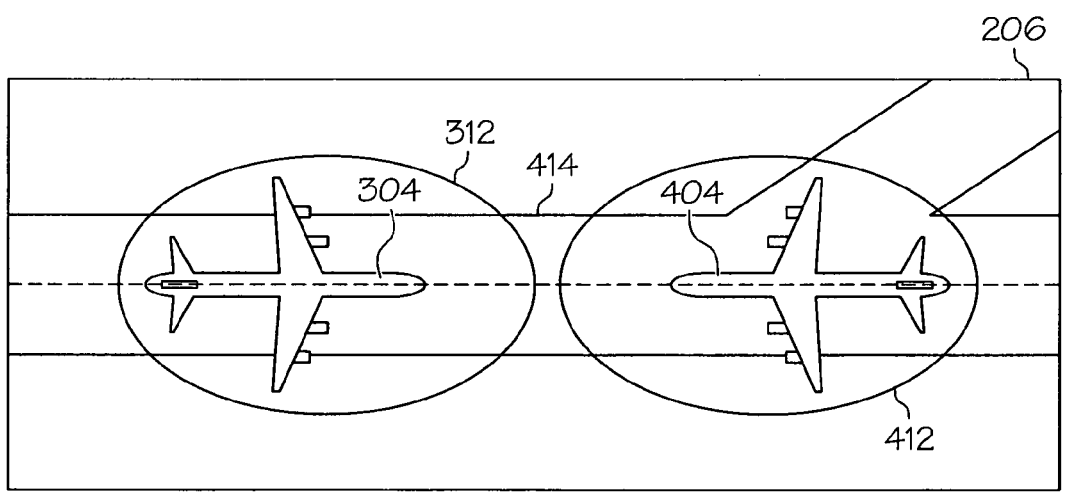
Figure 7:
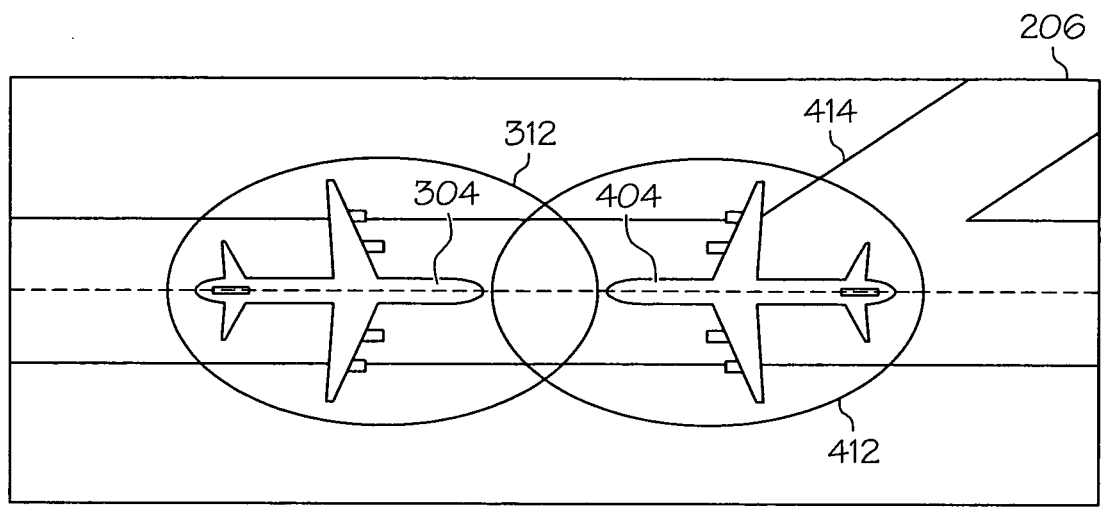

Referring now to FIGS. 5-7, during a ground maneuver, the processor 104 supplies display commands that cause the lateral situation display 206 to render a two-dimensional lateral situation view of the zone of protection 312 associated with that specific aircraft. For purposes of explanation, FIGS. 5-7 illustrate the associated zones of protection of two structures, and more specifically two aircraft traveling towards each other along a same directional path. In this particular embodiment, the lateral situation display 206 within each aircraft would include a top-view aircraft symbol 304, indicating aircraft ownship, and the aircraft zone of protection 312 and a top-view approaching aircraft symbol 404, indicating an approaching aircraft, and the aircraft zone of protection 412 associated with that aircraft. The lateral situation display 206 also preferably includes various map features including, but not limited to, a lateral two-dimensional view of airfield terrain 314, including a runway 414. The zone of protection 312 associated with aircraft ownship would change colors depending on immanency of an excursion into the other aircraft's zone of protection. FIG. 5 illustrates separation of zones 312 and 412 and an intended colorization of the zones of protection 312 and 412 of green to indicate no threat is impending due to sufficient time and space for pilot correction. FIG. 6 illustrates an intended amber colorization of zones of protection 312 and 412 to indicate an impending incursion between aircrafts indicated by symbols 304 and 404 unless corrective action is taken. FIG. 7 illustrates an intended red colorization of zones of protection 312 and 412 to indicate immediate action is required to avert an incursion between aircraft indicated by symbols 304 and 404.

In addition to causing the display device 112 to render an image of the zones of protection 312 or 412, the processor 104 is also preferably configured to supply image rendering commands that cause the display device 112 to render advisory indicia. More specifically, the processor 104 is preferably coupled to receive position data representative of current aircraft position or aircraft track and is further operable, in response thereto, to supply one or more aircraft position or track rendering display commands. The display device 112 is further coupled to receive the rendering commands and is further operable, in response thereto, to simultaneously render and image of the aircraft position or aircraft track relative to the zones of protection 312 or 412. Although the position and tracking data may be supplied from any one of numerous sources, in the depicted embodiments, the data is supplied from the sensors 110, and more particularly the GPS. No matter the specific source of the data, an image rendering command will be supplied if these data indicate that the zone of protection 312 of aircraft 304 is within a predetermined distance of a zone of protection 412 of approaching aircraft 404 or tracking toward the boundary of the zone of protection 412. The processor 104 supplies the image rendering command that causes the display device 112 to render the advisory indicia. It will be appreciated that this predetermined distance may vary.

The advisory indicia may additionally be rendered in response to various other parameters, not just distance. For example, the processor 104 may receive various other types of inertial data in addition to aircraft data during a ground maneuver, which are then processed to determine if aircraft 304 will reach or cross the boundary line of the zone of protection 412 in a predetermined amount of time. Data such as rate of speed, direction, and braking distance could be used to determine the amount of time for aircraft 304 to reach or cross the border of the zone of protection 412 from its current position. No matter the specific data used, if the processor 104 determines that the zone of protection 312 for aircraft 304 will reach the zone of protection 412 within the predetermined time period, the processor 104 supplies the image rendering commands that cause the display device 112 to render the advisory indicia.

It will be appreciated that the advisory indicia may be rendered according to any one of numerous paradigms. For example, as previously indicated the color in which the zone of protection 312 and/or boundary line of the zone of protection 312 are rendered could change, in whole or in part, from one color to another. In another example, the color in which zone of protection 412 or a boundary line of the zone of protection 412 are rendered could change, in whole or in part, from one color to another. As a specific example, the zone of protection 312 could be rendered in green if the aircraft 304 within the zone of protection 312 is not within the predetermined distance or predetermined time period for an incursion with the approaching aircraft 404 and its zone of protection 412; however, if the aircraft 304 within the zone of protection 312 moves within the predetermined distance or will reach or cross the zone of protection 412 in the predetermined time period, the zone of protection 312 is then rendered in amber. After the zones of protection 312 and 412 intersect, they would be rendered in red to indicate and imminent incursion. In an alternative exemplary embodiment, the advisory indicia is rendered as a separate symbol or set of symbols, such as text or other images.

It will additionally be appreciated that in still another alternative embodiment, which is shown in phantom in FIG. 1, the system 100 may be configured such that it additionally supplies visual and/or aural advisory indicia. For example, the system 100 could be configured to generate an aural warning when the aircraft 304 is within a predetermined distance of the zone of protection 412. Alternatively, the system 100 could generate the aural warning 116 along with a visual indicator 118, either on the display device 112 or a separate dedicated visual indicator. It will be appreciated that this aural warning could be implemented in anyone of numerous ways such as, for example, a buzzer, horn, alarm, or a voice indicator that states, for example, "Approaching aircraft—change path!" or "Threatened aircraft incursion—take corrective measures". In the depicted embodiment, this aural indicator is generated by processor 104; however, it will be appreciated that it could additionally be generated by any one of numerous other external systems or devices.

Figure 8:
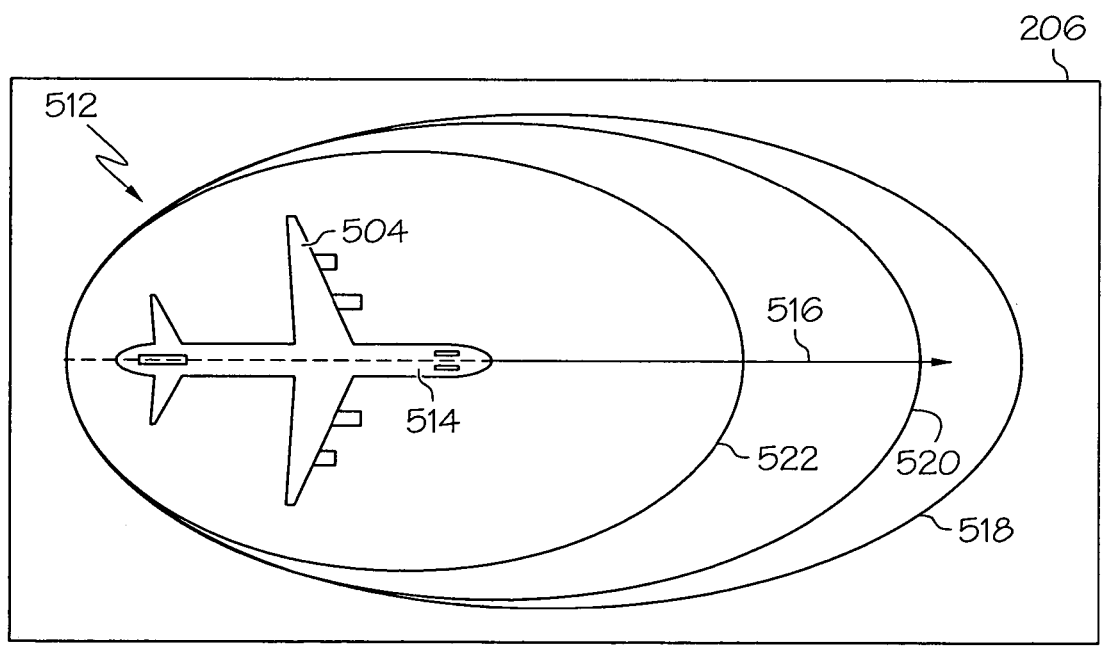
FIG. 8 is an exemplary display screen that depicts a lateral situation view of a multi-zonal zone of protection for an aircraft in accordance with the instant invention.

Referring now to FIG. 8, during a ground maneuver an early warning zone of protection, envelope or bubble, may be displayed on lateral situation display 206 as indicated. In this particular embodiment, a zone of protection 512 of an aircraft 504 is indicated. The zone of protection 512 is drawn along the centerline 514 of the aircraft's steering angle, typically in the direction of movement of the aircraft as indicated by arrow 516. Zone of protection 512 is indicated as comprised of three zonal areas 518, 520, and 522 depending upon the proximity of the incursion to aircraft 504. More specifically, zone of protection 518 provides an alert of incursion that will occur in excess of 10 seconds. It should be appreciated that zone of protection 518 may be colorized green to indicate no immediate threat of an incursion. Protective zone 520 provides an alert of an impending incursion in approximately 10 seconds. It should be appreciated that zone of protection 520 may be colorized amber to indicate the threat of an incursion. Corrective measures must be taken to eliminate this situation or an incursion will occur in approximately 10 seconds. Lastly, zone of protection 522 provides an alert of an impending incursion within 5 seconds. It should be appreciated that zone of protection 522 may be colorized red to indicate an immediate threat of an incursion. Corrective measures must be taken to eliminate this situation or an incursion will occur within 5 seconds. This zonal protective display provides a warning system to a flight crew in addition to that previously described and may additionally be used in conjunction with ground maneuvers about airfield structures, such as airport buildings, gate ramps, or the like.

Figure 9:
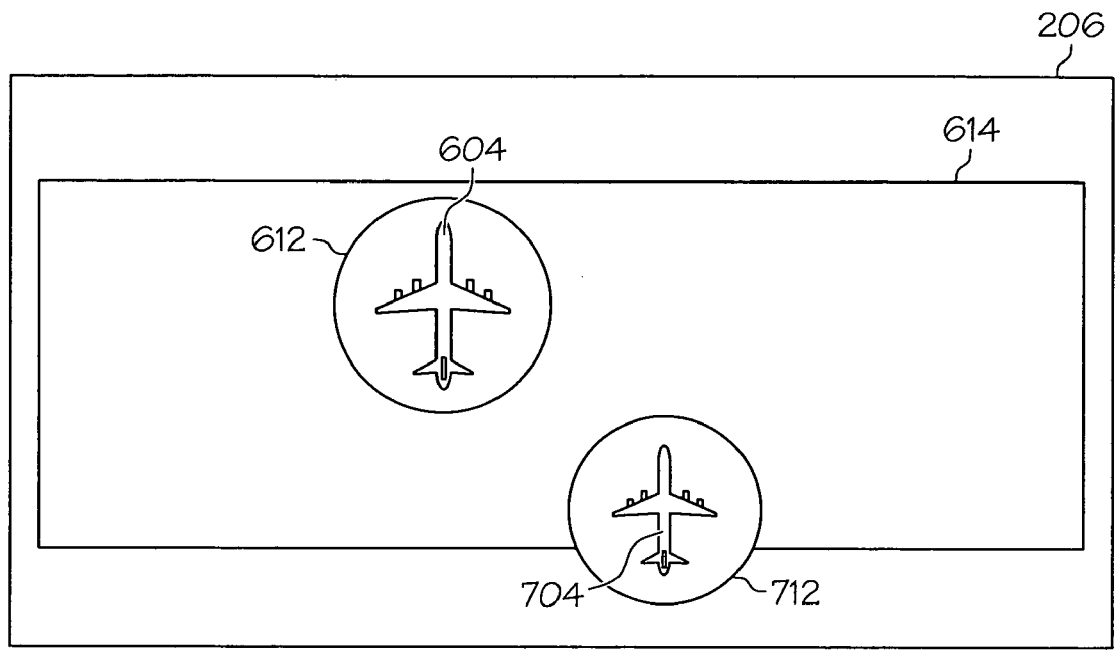
FIGS. 9-10 are exemplary display screens that depict a holding pad showing multiple aircraft protection zones in accordance with the instant invention.
Figure 10:
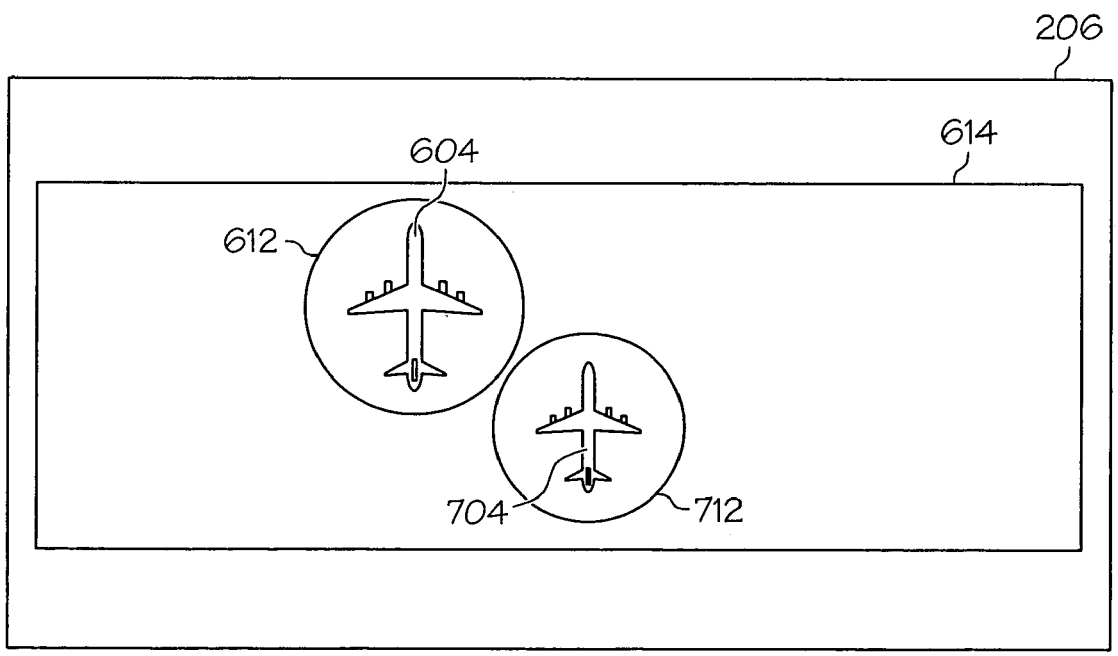

During a ground holding pattern, aircraft must position themselves in alignment generally as illustrated in FIGS. 9 and 10. Display 112 would indicate in lateral situation display 206, the terrain 614 of an airfield holding pad. More specifically, display 206 would indicate to a pilot of an aircraft, indicated in top-view by aircraft symbol 604, a zone of protection 612 associated with the aircraft while in the holding pattern. In addition, display 206 would display information regarding any surrounding aircraft, or an aircraft approaching the holding pad, as indicated by top-view aircraft symbol 704, and the zone of protection 712 associated with the approaching aircraft. The zones of protection 612 and 712 may be indicated by color, or the like as previously described to indicate no imminent incursion between the aircraft. As aircraft 704 nears aircraft 604 as illustrated in FIG. 10, zones of protection 612 and 712 may change to another color (e.g. amber) indicating an imminent incursion between the aircraft unless corrective measure is taken. It should be appreciated that the incursion avoidance system would include the capability of indicating zones of protection associated with any type of ground maneuver, including aircraft taxi to and from runways, and airport structures.

Figure 11:
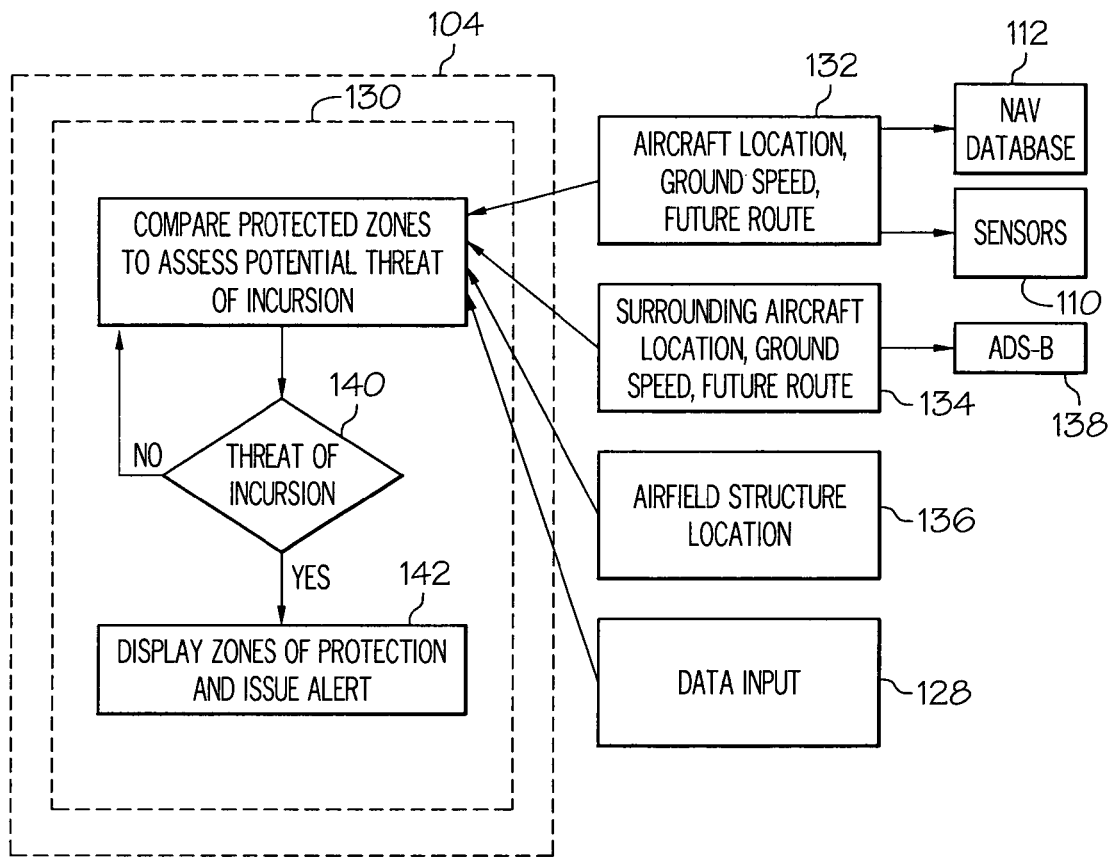
FIG. 11 is a flow chart and schematic of an algorithm that may be used in practicing the instant invention.

FIG. 11. is a flow chart and schematic of an algorithm that may be used in practicing the instant invention. Preferably, the processor 104 implements software (or firmware) based algorithm or process 130 in accordance with the invention. The aircraft location, aircraft type, groundspeed, and future route 132 are continuously supplied to the process 130 during ground maneuvers. The future route may be provided by a navigation database 112 or may be entered manually by the aircraft crew. In addition, surrounding aircraft data 134 and airfield structure data 136 are continuously made available to the process 130 during ground maneuvers. The location and groundspeed of the aircraft may be provided by sensors 110 such as inertial sensors or by a GPS. The surrounding aircraft data 134 may be provided by an ADS-B system 138. The airfield structure data 136 may be provided by terrain map overlays, or entered manually by the aircraft crew. In addition, an aircraft crew can provide an input 128 to the process 118 that indicates a parameter of interest. For example, "aircraft within 150 feet of zone of protection" or "airfield structure within 50 feet of zone of protection". Alternatively, the threat thresholds may be preset.

The process 130 is performed by processor 104 that indicates the zone of protection of the aircraft in comparison with data from approaching aircraft or of known airfield structures. A comparison is made between the aircraft zones of protection and the corresponding alert threshold entered by the crew. If the severity of a data set exceeds its corresponding threshold 140 as preset, or entered by the crew, and alert is created for this data set.

When the alert is created the display 112 (in those systems where a ground incursion avoidance system display is used that is separate from the multifunction display of FIG. 1) is activated. In this way, the display is not constantly active such that it may interfere with the concentration of the crew by displaying bright, colorful displays when the data to be displayed is not critical or the aircraft is en route. In the case of an integrated display system as set forth in FIG. 1, the display 112 switches from the currently operating mode, perhaps navigation or terrain display, to display the aircraft during ground maneuver and thus calling the crew's attention to the threat of an incursion 142 either continuously during the ground maneuver or only when it is within the preset parameters or parameters set by the crew. In either case the processor 104 may issue an alert in addition to activating the display, for example an audible alert may be issued by an annunciator (not shown) to alert the crew to evaluate the threat of incursion.

While preferred exemplary embodiments have been presented in the foregoing detailed description of preferred exemplary embodiments, it should be appreciated that a vast number of variations exist. It should also be appreciated that these preferred exemplary embodiments are only examples, and are not intended to limit the scope, applicability, or configuration of the invention in any way. Rather, the ensuing detailed description will provide those skilled in the art with a convenient road map for implementing a preferred embodiment of the invention, it being understood that various changes may be made in the function and arrangement of elements described in an exemplary preferred embodiment without departing from the spirit and scope of the invention as set forth in the appended claims.

What is claimed is:

1. A flight deck display system for an aircraft, comprising:
   a processor adapted to receive identification data from an aircraft identification database, the identification data representative of an aircraft during a ground maneuver, the processor operable, in response thereto, to determine a zone of protection about the aircraft and supply one or more image rendering display commands; and
   a display device coupled to receive the image rendering display commands and operable, in response thereto, to render an image of an envelope encompassing the aircraft that is representative of the zone of protection.

2. The system of claim 1, wherein the display device is operable to render a two-dimensional lateral situation view image representative of the zone of protection.

3. The system of claim 1, wherein the identification data representative of an aircraft during ground maneuver comprises data representative of at least one of aircraft type, aircraft dimensions, current aircraft position, speed, and direction of movement.

4. The system of claim 1, wherein the processor is further adapted to receive identification data representative of additional aircraft traffic.

5. The system of claim 4, wherein the identification data representative of additional aircraft traffic comprises data representative of each additional aircraft's type, dimensions, position, speed and direction of movement, the processor operable, in response thereto the receipt of data, to determine a zone of protection about each of the additional aircraft and supply one or more image rendering display commands.

6. The system of claim 1, wherein the processor is further adapted to receive identification data representative of at least one airfield structure, the processor operable, in response thereto, to determine a zone of protection about the at least one airfield structure and supply one or more image rendering display commands.

7. The system of claim 6, wherein identification data representative of the at least one airfield structure comprises data representative of a position of at least one of a runway structure, a holding pad, a gate ramp, an airport building, and an airport terminal.

8. A flight deck display system for an aircraft, comprising:
   a processor adapted to receive identification data from an aircraft identification database, the identification data representative of a first structure during a ground maneuver and at least a second structure, the processor operable, in response to the identification data, to determine a first zone of protection associated with the first structure and a second zone of protection associated with the second structure and supply one or more image rendering display commands; and
   a display device coupled to receive the image rendering display commands and operable, in response thereto, to render an image of an envelope encompassing each of the first structure and the second structure and representative of the first and second zones of protection.

9. The system of claim 8, wherein the first structure is an aircraft in which the flight deck display system is positioned.

10. The system of claim 8, wherein the identification data representative of first structure comprises identification data representative of aircraft type, dimensions, position, speed and direction of movement.

11. The system of claim 8, wherein the second structure is one of an additional aircraft and an airfield structure.

12. The system of claim 8, wherein identification data representative of a second structure comprises data representative of additional aircraft type, dimensions, position, speed, and direction of movement.

13. The system of claim 8, wherein identification data representative of a second structure comprises data representative of a location and dimensions of an airfield structure.

14. The system of claim 13, wherein the airfield structure comprises one of a runway structure, a holding pad, a gate ramp, an airport building, and an airport terminal.

15. The system of claim 8, wherein the display device is operable to render a two-dimensional lateral situation view image of an envelope encompassing each of the first structure and the second structure and representative of the first zone of protection and the second zone of protection.

16. A method of displaying a zone of protection during a ground maneuver on an aircraft flight deck display system, the method comprising the steps of:
   obtaining real-time vehicle ownship identification data during a ground maneuver from an aircraft identification database and at least one of real-time additional vehicle identification data and airfield structure data;
   determining a zone of protection associated with the vehicle ownship, and a zone of protection associated with at least one of the additional vehicle and the airfield structure based at least in part on the processed data;
   calculating whether at a present position, heading, and speed, the zone of protection associated with the vehicle ownship will encroach upon the zone of protection associated with at least one of the additional vehicle and the airfield structure; and
   displaying an image of an envelope encompassing each of the vehicle ownship, the additional vehicle and the airfield structure and representative of the determined zones of protection on the aircraft flight deck display system.

17. The method of claim 16, further comprising:
   processing identification data representative of vehicle ownship data and one of the additional vehicle identification data and airfield structure data; and displaying on the aircraft flight deck display system the image of the envelope encompassing the vehicle ownship and representative of the zone of protection associated with the vehicle ownship with an advisory indicia when the determined vehicle position is within either a predetermined distance of, or within a predetermined time to cross, a boundary of the zone of protection associated with one of the additional vehicle and the airfield structure.

18. The method of claim 16, wherein the zone of protection is displayed on the aircraft flight deck display as a two-dimensional image.

19. The method of claim 16, wherein the advisory indicia is a colorization representative of a degree of threat of an aircraft incursion.

* * * * *

UNITED STATES PATENT AND TRADEMARK OFFICE
CERTIFICATE OF CORRECTION

PATENT NO.       : 7,630,829 B2                                Page 1 of 1
APPLICATION NO. : 11/231216
DATED            : December 8, 2009
INVENTOR(S)      : David Pepitone It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Second Day of November, 2010

David J. Kappos
*Director of the United States Patent and Trademark Office*